F. P. JOHNSON.
TIRE FASTENING DEVICE.
APPLICATION FILED FEB. 28, 1913. RENEWED DEC. 17, 1913.
1,230,902. Patented June 26, 1917.
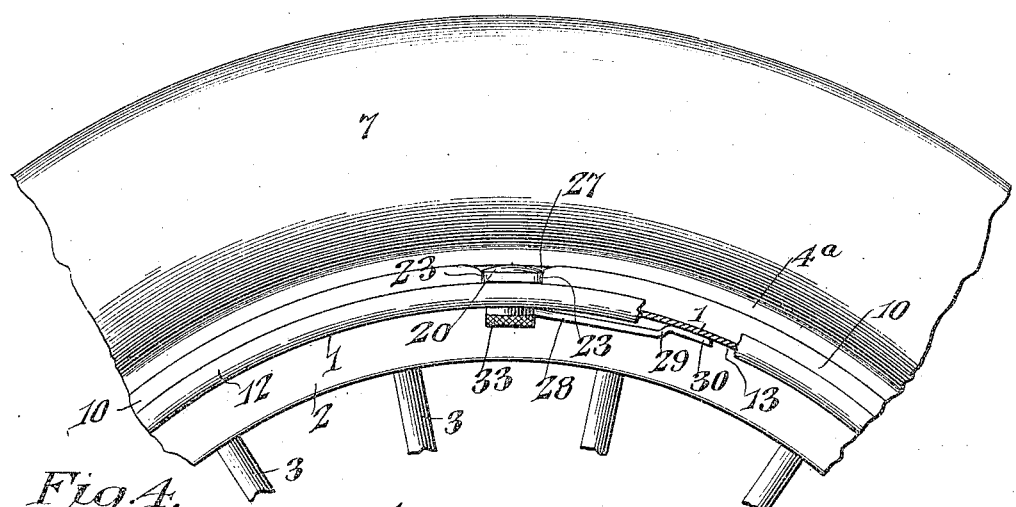
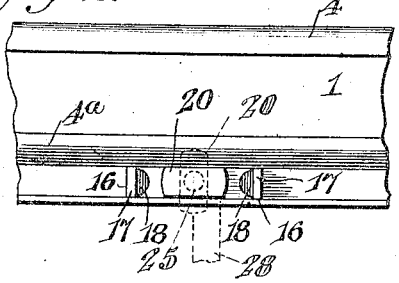
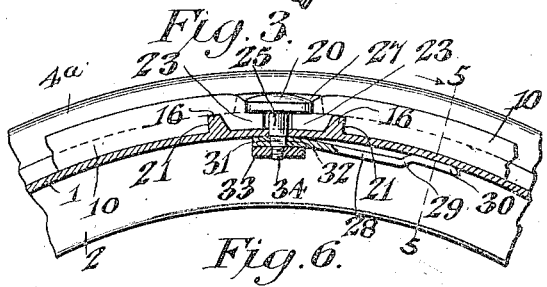
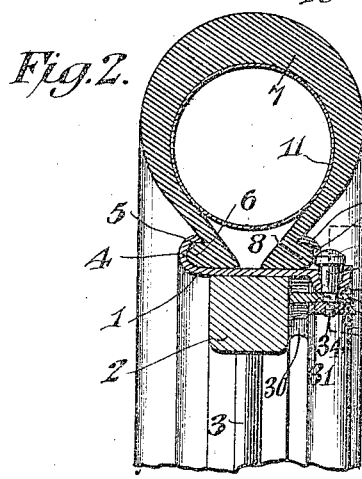
WITNESSES
Frank P. Johnson, INVENTOR
BY
ATTORNEY

UNITED STATES PATENT OFFICE.

FRANK P. JOHNSON, OF DANVILLE, PENNSYLVANIA.

TIRE-FASTENING DEVICE.

1,230,902. Specification of Letters Patent. Patented June 26, 1917.

Application filed February 28, 1913, Serial No. 751,375. Renewed December 17, 1913. Serial No. 807,356.

*To all whom it may concern:*

Be it known that I, FRANK P. JOHNSON, a citizen of the United States, residing at Danville, in the county of Montour and State of Pennsylvania, have invented a new and useful Tire-Fastening Device, of which the following is a specification.

The invention relates to improvements in tire fastening devices.
In my prior application, filed on the 27th day of May, 1912, Serial No. 699,965, the operating hasp or arm for rotating the locking device to engage the head thereof with and disengage the same from the terminals of the split ring, is secured to the rim by the valve of the inner tube, thereby retaining the locking device in its engaged position. The present invention provides for the locking device an operating handle or arm adapted to be directly engaged with the rim of the wheel to retain the locking device in engagement with the split ring.

The object of the present invention is to improve the construction of tire fastening devices, and to provide a simple, inexpensive and efficient tire fastening device of strong and durable construction, designed for securing a pneumatic tire of the detachable type to the rim of an automobile or other vehicle wheel, and capable of ready operation to enable a pneumatic tire to be easily and quickly removed from a wheel to repair or replace an inner tube, or for any other purpose.
With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claim, may be resorted to without departing from the spirit or sacrificing any of the advantages of the invention.

In the drawing:—

Figure 1 is a side elevation of a portion of a wheel equipped with a tire fastening device, constructed in accordance with this invention.

Fig. 2 is a transverse sectional view.

Fig. 3 is a detail longitudinal sectional view on the line 3—3 of Fig. 2.

Fig. 4 is a plan view of a portion of the rim and the detachable tire engaging ring.

Fig. 5 is a transverse sectional view on the line 5—5 of Fig. 3.

Fig. 6 is a detail view of a portion of the detachable tire engaging ring.

Fig. 7 is a detail perspective view, illustrating the construction of the ends of the split tire retaining ring.

Fig. 8 is a detail perspective view of the locking device.

Fig. 9 is a detail perspective view, showing the improvement applied to a grooved split ring.

Like numerals of reference designate corresponding parts in all the figures of the drawing.

In the accompanying drawing in which is illustrated the preferred embodiment of the invention, 1 designates a rim designed to be constructed of metal and secured by any suitable means to a wooden felly 2. The felly 2 is connected with the outer ends of spokes 3 of an automobile or other vehicle wheel, which may be of any preferred construction. The rim 1, which is cylindrical, is provided at one of its side edges with an integral circumferential flange 4, having a groove 5 in its inner face to receive the longitudinal bead 6 of the adjacent side of the outer tube or shoe 7 of a pneumatic tire. The bead 8 at the opposite side of the outer tube or shoe engages a groove 9 in the inner side or face of a tire engaging ring 4ª, detachably retained on the rim by a split ring 10 and coöperating with the fixed flange 4 in securing the pneumatic tire to the rim. The pneumatic tire, which is of the clencher type, may be of any preferred construction, and it has an inner tube 11, constructed in the usual manner.

The split ring, which is resilient, is constructed of suitable metal, and it is seated in a circumferential channel 15, formed in the rim adjacent to the side edge thereof and providing a circumferential rib or bead 12 at the inner face of the rim arranged in spaced relation with the wooden felly to form a circumferential groove 13, as clearly illustrated in Fig. 5 of the drawing. The channel is segmental in cross section, and the inner periphery of the split ring is rounded to fit the same. The rim is provided at the said channel with spaced integral lugs 16, extending across the circumferential channel and having straight radially arranged shoulders 17 and beveled faces

18, the beveled faces being located opposite each other and in opposite sides of an opening 19 in the rim in which is mounted an approximately T-shaped locking device 20 for retaining the split ring in the channel 15 and for holding the same in engagement with the fixed transverse lug 16. The terminal portions of the split ring are provided at the inner periphery of the said split ring with notches 21, conforming to the configuration of the lugs and snugly receiving the same and forming radially arranged shoulders for engaging the shoulders of the transverse lugs. The fixed transverse lugs and the notches in the inner periphery of the split ring interlock the latter with the rim and prevent the split ring from creeping or moving longitudinally in the channel 15. The notches are located adjacent to the ends of the split ring, and the terminals of the latter have spaced inner portions 22 and are provided beyond the same with opposite recesses 23 to receive the T-shaped locking member.

The T-shaped locking member consists of an oblong head and a rounded stem or pivot 25, journaled in the opening 19 of the rim and extending between the spaced terminal portions 22 of the split ring, the head of the T-shaped locking device being located opposite the recesses 23 and adapted to be carried into and out of the same by a rotary movement of the stem or pivot. The locking member is adapted to be rotated to arrange the head either transversely of the rim or longitudinally thereof, and when it is disposed transversely of the rim, it is out of engagement with the recessed terminal portions of the split ring, and the latter is thereby released and may be readily sprung out of engagement with the fixed lug 16 of the rim. When the head of the locking member extends longitudinally of the rim, it projects into the opposite recesses 23 and fits against the bottom walls thereof and holds the split ring firmly in its interlocked relation with the rim. The inner edges 26 of the head of the T-shaped fastening are rounded to enable the head to clear the end walls of the recesses 23. The continuous tire engaging ring 4ª is provided with an oblong recess 27 of a size to permit the ring 4ª to be passed over the head of the T-shaped catch in placing the tire engaging ring on and removing it from the rim.

The T-shaped locking member is operated to turn its head into and out of engagement with the terminal recesses 23 of the split ring by means of an arm 28, fixed to the inner end of the stem or pivot 25 and constructed of resilient material and provided adjacent to its outer end with a bend 29 offsetting its outer portion 30 slightly beyond the plane of the inner portion. The arm is located at the inner face of the rim, and it is adapted to be turned longitudinally of the same, and its terminal portion 30 engages in the groove 13 at the inner side or behind the rib or bead, as shown in Figs. 2 and 5, the arm being constructed of suitable material to enable its terminal portion 30 to be readily sprung into and out of engagement with the said groove. The inner end of the operating arm may be connected to the stem or pivot 25 in any suitable manner, and in the accompanying drawing the said stem or pivot is provided with a reduced squared portion 31, and the arm, which has a polygonal opening 32 to fit the squared portion, is retained thereon by a nut 33 arranged on the threaded terminal 34 of the stem or pivot. The operating arm 28 when engaged with the groove of the rim is arranged out of the way so that it will not come in contact with a stone or other obstruction in its use on an automobile or other vehicle wheel. It is adapted to be readily sprung out of engagement with the groove of the wheel when it is desired to turn the locking device.

In the present application no claim is made broadly to the split ring interlocked with the rim by the lugs and notches and provided with terminal recesses and having an entrance to the same at the inner periphery of the ring to permit the split ring to be passed over the head of the locking device, as this construction forms the subject-matter of certain claims of my prior copending application, filed May 27, 1912, Serial No. 699,965. Some of the claims of the present case, however, are generic to and are sufficiently broad to cover the form of invention shown and described in my later copending application, filed on the 14th day of July, 1913, Serial No. 778,949, as the latter application includes as a feature the resilient operating arm fixed to the rotary locking device and detachably interlocked with the rim of the wheel to maintain the locking device in engagement with the split ring. Instead of providing a continuous ring 4ª for engaging one side of the outer tube or shoe, the split ring may, as illustrated in Fig. 9 of the drawings and as shown and described in my said copending application, be provided with a groove to receive the adjacent bead of the tire.

What is claimed is:—

1. A device of the class described, comprising a rim provided with a circumferential channel forming a rib at its inner face, a continuous tire-engaging ring arranged on the rim adjacent the said channel and provided with a recess, a split ring mounted in the channel of the rim and retaining the tire-engaging ring in place, and a rotary locking member mounted in the rim radially thereof and having a locking head to engage the split ring, said locking member being in transverse alinement with the recess of the tire engaging ring.

2. A device of the class described including a rim having an opening, a continuous tire engaging ring arranged on the rim and provided at its inner periphery with a recess located at the said opening, a split ring arranged on the rim and retaining the tire engaging ring on the same, a rotary locking member passed through the opening of the rim and having a head at its outer end to engage the split ring, and an arm connected with the inner end of the rotary locking member for turning the same.

3. A device of the class described including a rim provided at its inner face with a rib, a split ring mounted on the rim, a rotary locking member mounted in the rim on an axis radial to the rim and having a head to engage the split ring, and an operating arm fixed to the locking member and provided between its ends with a bend forming an offset outer portion adapted to engage behind the rib of the rim.

4. A device of the class described including a rim, a split ring mounted on the rim, a rotary locking member pivotally mounted in the rim at the meeting ends of the split ring and having a head at its outer end on opposite sides of the pivot to engage both ends of the said ring, a resilient operating arm fixed to the pivot of the locking member at its inner end and provided at its outer end with means for engaging the rim for holding the locking member against rotary movement.

5. A device of the class described, including a rim provided on its inner face with a rib, a split ring mounted on the rim, a locking member mounted in the rim and having a head to engage the split ring, and an operating arm fixed to the locking member and having an offset portion to engage the inner side of the rib for holding the locking member against movement.

6. A device of the class described, including a rim provided on its inner face with a rib, a split ring mounted on the rim, a locking member mounted in the rim and having a head to engage the split ring, and an operating arm fixed to the locking member and provided with a resilient portion, said arm having its terminal portion adapted to be sprung into and out of engagement behind the rib.

In testimony, that I claim the foregoing as my own, I have hereto affixed my signature in the presence of two witnesses.

FRANK P. JOHNSON.

Witnesses:
 WM. L. SIDLER,
 MARGARET SIDLER.